(12) United States Patent
Kline

(10) Patent No.: US 7,307,511 B2
(45) Date of Patent: Dec. 11, 2007

(54) POWER LINE COMMUNICATION SYSTEM AND METHOD

(75) Inventor: Paul A. Kline, Gaithersburg, MD (US)

(73) Assignee: Current Technologies, LLC, Germantown, MD (US)

( * ) Notice: Subject to any disclaimer, the term of this patent is extended or adjusted under 35 U.S.C. 154(b) by 410 days.

(21) Appl. No.: 11/134,377

(22) Filed: May 23, 2005

(65) Prior Publication Data

US 2005/0206507 A1     Sep. 22, 2005

Related U.S. Application Data

(63) Continuation of application No. 09/835,532, filed on Apr. 16, 2001, now Pat. No. 6,958,680.

(60) Provisional application No. 60/197,615, filed on Apr. 14, 2000.

(51) Int. Cl.
*H04M 11/04* (2006.01)

(52) U.S. Cl. ............... 340/310.17; 340/310.16; 340/538.16; 340/538.17

(58) Field of Classification Search ........... 340/310.11, 340/310.12, 310.13, 310.16, 310.17, 310.18, 340/538, 538.11, 538.16, 538.17; 307/104; 370/487, 478; 375/258

See application file for complete search history.

(56) References Cited

U.S. PATENT DOCUMENTS

| | | | |
|---|---|---|---|
| 2,298,435 A | 10/1942 | Tunick |
| 2,577,731 A | 12/1951 | Berger |
| 3,445,814 A | 5/1969 | Spalti |
| 3,605,009 A | 9/1971 | Enge |
| 3,641,536 A | 2/1972 | Prosprich |
| 3,656,112 A | 4/1972 | Paull |
| 3,701,057 A | 10/1972 | Hoer |
| 3,702,460 A | 11/1972 | Blose |
| 3,810,096 A | 5/1974 | Kabat et al. |
| 3,895,370 A | 7/1975 | Valentini |
| 3,900,842 A | 8/1975 | Calabro et al. |
| 3,942,168 A | 3/1976 | Whyte |
| 3,942,170 A | 3/1976 | Whyte |
| 3,944,723 A | 3/1976 | Fong |
| 3,962,547 A | 6/1976 | Pattantyus-Abraham |
| 3,964,048 A | 6/1976 | Lusk et al. |

(Continued)

FOREIGN PATENT DOCUMENTS

DE     197 28 270 A1     1/1999

(Continued)

OTHER PUBLICATIONS

U.S. Appl. No. 10/884,564, filed Jul. 2, 2004.

(Continued)

*Primary Examiner*—Van T. Trieu
(74) *Attorney, Agent, or Firm*—Mel Barnes; Capital Legal Group, LLC

(57) ABSTRACT

The last portion of the electrical distribution system is used to provide high-speed communications to residential homes. An aggregation point interfaces a medium voltage power line with a point-of-presence, and a power line bridge enables flow of communications signals between the medium voltage power line and a low voltage power line across a distribution transformer.

35 Claims, 3 Drawing Sheets

U.S. PATENT DOCUMENTS

| | | |
|---|---|---|
| 3,967,264 A | 6/1976 | Whyte et al. |
| 3,973,240 A | 8/1976 | Fong |
| 4,004,110 A | 1/1977 | Whyte |
| 4,004,257 A | 1/1977 | Geissler |
| 4,012,733 A | 3/1977 | Whyte |
| 4,016,429 A | 4/1977 | Vercellotti et al. |
| 4,017,845 A | 4/1977 | Kilian et al. |
| 4,053,876 A | 10/1977 | Taylor |
| 4,057,793 A | 11/1977 | Johnson et al. |
| 4,060,735 A | 11/1977 | Pascucci et al. |
| 4,070,572 A | 1/1978 | Summerhayes |
| 4,142,178 A | 2/1979 | Whyte et al. |
| 4,188,619 A | 2/1980 | Perkins |
| 4,239,940 A | 12/1980 | Dorfman |
| 4,250,489 A | 2/1981 | Dudash et al. |
| 4,254,402 A | 3/1981 | Perkins |
| 4,263,549 A | 4/1981 | Toppeto |
| 4,323,882 A | 4/1982 | Gajjer |
| 4,357,598 A | 11/1982 | Melvin, Jr. |
| 4,386,436 A | 5/1983 | Kocher et al. |
| 4,408,186 A | 10/1983 | Howell |
| 4,413,250 A | 11/1983 | Porter et al. |
| 4,433,284 A | 2/1984 | Perkins |
| 4,442,492 A | 4/1984 | Karlsson et al. |
| 4,457,014 A | 6/1984 | Bloy |
| 4,473,816 A | 9/1984 | Perkins |
| 4,473,817 A | 9/1984 | Perkins |
| 4,481,501 A | 11/1984 | Perkins |
| 4,504,705 A | 3/1985 | Pilloud |
| 4,569,045 A | 2/1986 | Schieble et al. |
| 4,636,771 A | 1/1987 | Ochs |
| 4,638,298 A | 1/1987 | Spiro |
| 4,642,607 A | 2/1987 | Strom et al. |
| 4,644,321 A | 2/1987 | Kennon |
| 4,652,855 A | 3/1987 | Weikel |
| 4,668,934 A | 5/1987 | Shuey |
| 4,675,648 A | 6/1987 | Roth et al. |
| 4,683,450 A | 7/1987 | Max et al. |
| 4,686,382 A | 8/1987 | Shuey |
| 4,697,166 A | 9/1987 | Warnagiris et al. |
| 4,724,381 A | 2/1988 | Crimmins |
| 4,745,391 A | 5/1988 | Gajjar |
| 4,746,897 A | 5/1988 | Shuey |
| 4,749,992 A | 6/1988 | Fitzmeyer et al. |
| 4,766,414 A | 8/1988 | Shuey |
| 4,800,363 A | 1/1989 | Braun et al. |
| 4,815,106 A | 3/1989 | Propp et al. |
| 4,890,089 A | 12/1989 | Shuey |
| 4,903,006 A | 2/1990 | Boomgaard |
| 4,904,996 A | 2/1990 | Fernandes |
| 4,962,496 A | 10/1990 | Vercellotti et al. |
| 4,973,940 A | 11/1990 | Sakai et al. |
| 5,006,846 A | 4/1991 | Granville et al. |
| 5,066,939 A | 11/1991 | Mansfield, Jr. |
| 5,132,992 A | 7/1992 | Yurt et al. |
| 5,148,144 A | 9/1992 | Sutterlin et al. |
| 5,185,591 A | 2/1993 | Shuey |
| 5,191,467 A | 3/1993 | Kapany et al. |
| 5,210,519 A | 5/1993 | Moore |
| 5,257,006 A | 10/1993 | Graham et al. |
| 5,264,823 A | 11/1993 | Stevens |
| 5,272,462 A | 12/1993 | Teyssandier et al. |
| 5,301,208 A | 4/1994 | Rhodes |
| 5,341,265 A | 8/1994 | Westrom et al. |
| 5,369,356 A | 11/1994 | Kinney et al. |
| 5,406,249 A | 4/1995 | Pettus |
| 5,410,720 A | 4/1995 | Osterman |
| 5,426,360 A | 6/1995 | Maraio et al. |
| 5,448,229 A | 9/1995 | Lee, Jr. |
| 5,481,249 A | 1/1996 | Sato |
| 5,485,040 A | 1/1996 | Sutterlin |
| 5,497,142 A | 3/1996 | Chaffanjon |
| 5,498,956 A | 3/1996 | Kinney et al. |
| 5,533,054 A | 7/1996 | DeAndrea et al. |
| 5,537,087 A | 7/1996 | Naito |
| 5,559,377 A | 9/1996 | Abraham |
| 5,568,185 A | 10/1996 | Yoshikazu |
| 5,579,221 A | 11/1996 | Mun |
| 5,592,354 A | 1/1997 | Nocentino, Jr. |
| 5,592,482 A | 1/1997 | Abraham |
| 5,598,406 A | 1/1997 | Albrecht et al. |
| 5,616,969 A | 4/1997 | Morava |
| 5,625,863 A | 4/1997 | Abraham |
| 5,630,204 A | 5/1997 | Hylton et al. |
| 5,684,450 A | 11/1997 | Brown |
| 5,691,691 A | 11/1997 | Merwin et al. |
| 5,705,974 A | 1/1998 | Patel et al. |
| 5,712,614 A | 1/1998 | Patel et al. |
| 5,717,685 A | 2/1998 | Abraham |
| 5,726,980 A | 3/1998 | Rickard |
| 5,748,104 A | 5/1998 | Argyroudis et al. |
| 5,751,803 A | 5/1998 | Shpater |
| 5,770,996 A | 6/1998 | Severson et al. |
| 5,777,545 A | 7/1998 | Patel et al. |
| 5,777,769 A | 7/1998 | Coutinho |
| 5,778,116 A | 7/1998 | Tomich |
| 5,796,607 A | 8/1998 | Le Van Suu |
| 5,798,913 A | 8/1998 | Tiesinga et al. |
| 5,805,053 A | 9/1998 | Patel et al. |
| 5,805,458 A | 9/1998 | McNamara et al. |
| 5,818,127 A | 10/1998 | Abraham |
| 5,828,293 A | 10/1998 | Rickard |
| 5,835,005 A | 11/1998 | Furukawa et al. |
| 5,850,114 A | 12/1998 | Froidevaux |
| 5,856,776 A | 1/1999 | Armstrong et al. |
| 5,870,016 A | 2/1999 | Shrestha |
| 5,892,430 A | 4/1999 | Wiesman et al. |
| 5,929,750 A | 7/1999 | Brown |
| 5,933,071 A | 8/1999 | Brown |
| 5,933,073 A | 8/1999 | Shuey |
| 5,937,342 A | 8/1999 | Kline |
| 5,949,327 A | 9/1999 | Brown |
| 5,952,914 A | 9/1999 | Wynn |
| 5,977,650 A | 11/1999 | Rickard et al. |
| 5,978,371 A | 11/1999 | Mason, Jr. et al. |
| 5,982,276 A | 11/1999 | Stewart |
| 5,994,998 A | 11/1999 | Fisher et al. |
| 5,994,999 A | 11/1999 | Ebersohl |
| 6,014,386 A | 1/2000 | Abraham |
| 6,023,106 A | 2/2000 | Abraham |
| 6,037,857 A | 3/2000 | Behrens et al. |
| 6,040,759 A | 3/2000 | Sanderson |
| 6,091,932 A | 7/2000 | Langlais |
| 6,104,707 A | 8/2000 | Abraham |
| 6,121,765 A | 9/2000 | Carlson |
| 6,130,896 A | 10/2000 | Lueker et al. |
| 6,140,911 A | 10/2000 | Fisher et al. |
| 6,141,634 A | 10/2000 | Flint et al. |
| 6,144,292 A | 11/2000 | Brown |
| 6,151,330 A | 11/2000 | Liberman |
| 6,154,488 A | 11/2000 | Hunt |
| 6,157,292 A | 12/2000 | Piercy et al. |
| 6,172,597 B1 | 1/2001 | Brown |
| 6,175,860 B1 | 1/2001 | Gaucher |
| 6,177,849 B1 | 1/2001 | Barsellotti et al. |
| 6,212,658 B1 | 4/2001 | Le Van Suu |
| 6,229,434 B1 | 5/2001 | Knapp et al. |
| 6,239,722 B1 | 5/2001 | Colton et al. |
| 6,243,413 B1 | 6/2001 | Beukema |
| 6,243,571 B1 | 6/2001 | Bullock et al. |
| 6,255,805 B1 | 7/2001 | Papalia et al. |
| 6,255,935 B1 | 7/2001 | Lehmann et al. |
| 6,275,144 B1 | 8/2001 | Rumbaugh |
| 6,282,405 B1 | 8/2001 | Brown |

| | | |
|---|---|---|
| 6,297,730 B1 | 10/2001 | Dickinson |
| 6,300,881 B1 | 10/2001 | Yee et al. |
| 6,313,738 B1 | 11/2001 | Wynn |
| 6,317,031 B1 | 11/2001 | Rickard |
| 6,331,814 B1 | 12/2001 | Albano et al. |
| 6,335,672 B1 | 1/2002 | Tumlin et al. |
| 6,373,376 B1 | 4/2002 | Adams et al. |
| 6,384,580 B1 | 5/2002 | Ochoa et al. |
| 6,396,391 B1 | 5/2002 | Binder |
| 6,396,392 B1 | 5/2002 | Abraham |
| 6,404,773 B1 | 6/2002 | Williams et al. |
| 6,407,987 B1 | 6/2002 | Abraham |
| 6,414,578 B1 | 7/2002 | Jitaru |
| 6,417,762 B1 | 7/2002 | Comer |
| 6,449,318 B1 | 9/2002 | Rumbaugh |
| 6,452,482 B1 | 9/2002 | Cern |
| 6,480,510 B1 | 11/2002 | Binder |
| 6,486,747 B1 | 11/2002 | DeCramer et al. |
| 6,492,897 B1 | 12/2002 | Mowery, Jr. |
| 6,496,104 B2 | 12/2002 | Kline |
| 6,504,357 B1 | 1/2003 | Hemminger et al. |
| 6,507,573 B1 | 1/2003 | Brandt et al. |
| 6,515,485 B1 | 2/2003 | Bullock et al. |
| 6,522,626 B1 | 2/2003 | Greenwood |
| 6,549,120 B1 | 4/2003 | De Buda |
| 6,577,231 B2 | 6/2003 | Litwin, Jr. et al. |
| 6,590,493 B1 | 7/2003 | Rasimas |
| 6,611,134 B2 | 8/2003 | Chung |
| 6,624,532 B1 | 9/2003 | Davidow et al. |
| 6,646,447 B2 | 11/2003 | Cern et al. |
| 6,650,249 B2 | 11/2003 | Meyer et al. |
| 6,667,685 B2 | 12/2003 | Wasaki et al. |
| 6,668,058 B2 | 12/2003 | Grimes |
| 6,683,531 B2 | 1/2004 | Diamanti et al. |
| 6,686,832 B2 | 2/2004 | Abraham |
| 6,785,532 B1 | 8/2004 | Rickard |
| 6,785,592 B1 | 8/2004 | Smith et al. |
| 6,788,745 B1 | 9/2004 | Lim et al. |
| 6,844,809 B2 | 1/2005 | Manis et al. |
| 6,897,764 B2 * | 5/2005 | Cern .......................... 375/258 |
| 6,922,135 B2 | 7/2005 | Abraham |
| 6,933,835 B2 | 8/2005 | Kline |
| 6,950,567 B2 | 9/2005 | Kline |
| 6,958,680 B2 | 10/2005 | Kline |
| 6,965,302 B2 | 11/2005 | Mollenkopf et al. |
| 6,965,303 B2 | 11/2005 | Mollenkopf |
| 6,980,090 B2 | 12/2005 | Mollenkopf |
| 6,980,091 B2 | 12/2005 | White et al. |
| 6,985,714 B2 | 1/2006 | Akiyama et al. |
| 6,998,962 B2 | 2/2006 | Cope et al. |
| 7,042,351 B2 | 5/2006 | Kline |
| 7,046,882 B2 | 5/2006 | Kline |
| 7,103,240 B2 | 9/2006 | Kline |
| 2001/0045888 A1 | 11/2001 | Kline |
| 2001/0052843 A1 | 12/2001 | Wiesman et al. |
| 2001/0054953 A1 | 12/2001 | Kline |
| 2002/0002040 A1 | 1/2002 | Kline et al. |
| 2002/0010870 A1 | 1/2002 | Gardner |
| 2002/0027496 A1 | 3/2002 | Cern et al. |
| 2002/0041228 A1 | 4/2002 | Zhang |
| 2002/0048368 A1 | 4/2002 | Gardner |
| 2002/0060624 A1 | 5/2002 | Zhang |
| 2002/0080010 A1 | 6/2002 | Zhang |
| 2002/0095662 A1 | 7/2002 | Ashlock et al. |
| 2002/0097953 A1 | 7/2002 | Kline |
| 2002/0098867 A1 | 7/2002 | Meiksen et al. |
| 2002/0105413 A1 | 8/2002 | Cern et al. |
| 2002/0109585 A1 | 8/2002 | Sanderson |
| 2002/0110310 A1 | 8/2002 | Kline |
| 2002/0110311 A1 | 8/2002 | Kline |
| 2002/0118101 A1 | 8/2002 | Kline |
| 2002/0121963 A1 | 9/2002 | Kline |
| 2002/0154000 A1 | 10/2002 | Kline |
| 2003/0039257 A1 | 2/2003 | Manis |
| 2003/0090368 A1 | 5/2003 | Ide |
| 2003/0103307 A1 | 6/2003 | Dostert |
| 2003/0107477 A1 | 6/2003 | Ide |
| 2003/0149784 A1 | 8/2003 | Ide |
| 2003/0160684 A1 | 8/2003 | Cern |
| 2003/0169155 A1 | 9/2003 | Mollenkopf et al. |
| 2003/0224784 A1 | 12/2003 | Hunt et al. |
| 2003/0227373 A1 | 12/2003 | Lou et al. |
| 2004/0056734 A1 | 3/2004 | Davidow |
| 2004/0083066 A1 | 4/2004 | Hayes et al. |
| 2004/0110483 A1 | 6/2004 | Mollenkopf |
| 2004/0113756 A1 | 6/2004 | Mollenkopf |
| 2004/0113757 A1 | 6/2004 | White, II et al. |
| 2004/0135676 A1 | 7/2004 | Berkman et al. |
| 2004/0223617 A1 | 11/2004 | Corcoran et al. |
| 2004/0227621 A1 | 11/2004 | Cope et al. |
| 2004/0227622 A1 | 11/2004 | Giannini et al. |
| 2004/0246107 A1 | 12/2004 | Kline |
| 2005/0128057 A1 | 6/2005 | Mansfield et al. |
| 2005/0168326 A1 | 8/2005 | White et al. |
| 2005/0285720 A1 | 12/2005 | Cope et al. |
| 2006/0049693 A1 | 3/2006 | Abraham et al. |

FOREIGN PATENT DOCUMENTS

| | | |
|---|---|---|
| DE | 100 12 235 C2 | 12/2001 |
| DE | 100 47 648 A1 | 4/2002 |
| DE | 100 61 584 A1 | 6/2002 |
| DE | 100 61 586 A1 | 6/2002 |
| DE | 101 00 181 A1 | 7/2002 |
| DE | 101 03 530 A1 | 8/2002 |
| DE | 100 59 564 A1 | 9/2002 |
| DE | 100 48 348 C2 | 11/2002 |
| DE | 100 26 930 C2 | 1/2003 |
| DE | 100 26 931 C2 | 1/2003 |
| DE | 100 42 958 C2 | 1/2003 |
| EP | 0 581 351 A1 | 2/1994 |
| EP | 0 632 602 A2 | 1/1995 |
| EP | 0 470 185 B1 | 11/1995 |
| EP | 0 822 721 A2 | 2/1998 |
| EP | 0 822 721 A3 | 2/1998 |
| EP | 0 913 955 A2 | 5/1999 |
| EP | 0 933 883 A2 | 8/1999 |
| EP | 0 933 883 A3 | 8/1999 |
| EP | 0 948 143 A2 | 10/1999 |
| EP | 1 011 235 A2 | 6/2000 |
| EP | 1 014 640 A2 | 6/2000 |
| EP | 1 043 866 A2 | 10/2000 |
| EP | 1 043 866 A3 | 10/2000 |
| EP | 1 075 091 A1 | 2/2001 |
| EP | 0 916 194 B1 | 9/2001 |
| EP | 1 011 235 A3 | 5/2002 |
| EP | 1 213 849 A1 | 6/2002 |
| EP | 1 217 760 A1 | 6/2002 |
| EP | 1 014 640 A3 | 7/2002 |
| EP | 1 021 866 B1 | 10/2002 |
| EP | 1 251 646 A2 | 10/2002 |
| EP | 1 253 699 A2 | 10/2002 |
| ES | 2 122 920 A1 | 12/1998 |
| GB | 2 293 950 A | 4/1996 |
| GB | 2 315 937 A | 2/1998 |
| GB | 2 331 683 A | 5/1999 |
| GB | 2335335 | 9/1999 |
| GB | 2 342 264 A | 4/2000 |
| GB | 2 347 601 A | 9/2000 |
| JP | 1276933 | 11/1989 |
| NZ | 276741 | 7/1998 |
| WO | 95/29536 A1 | 11/1995 |
| WO | 98/40980 A1 | 9/1998 |
| WO | 99/59261 A1 | 11/1999 |
| WO | 00/16496 A2 | 3/2000 |
| WO | 00/59076 A1 | 10/2000 |

| | | |
|---|---|---|
| WO | 00/60701 A1 | 10/2000 |
| WO | 01/60822 A1 | 10/2000 |
| WO | 01/08321 A1 | 2/2001 |
| WO | 01/43305 A1 | 6/2001 |
| WO | 01/50625 A2 | 7/2001 |
| WO | 01/50625 A3 | 7/2001 |
| WO | 01/50628 A1 | 7/2001 |
| WO | 01/50629 A1 | 7/2001 |
| WO | 01/63787 A1 | 8/2001 |
| WO | 02/17509 A1 | 2/2002 |
| WO | 02/37712 A1 | 5/2002 |
| WO | 02/054605 A1 | 7/2002 |
| WO | 02/065684 A2 | 8/2002 |
| WO | 03/039022 A1 | 5/2003 |

OTHER PUBLICATIONS

"White Paper on Medium Voltage Powerline Communication (PLC) Networks", *CIGRE SC D2 WG 14, Broadband PLC*, (Mar. 2005), 1-58.
U.S. Appl. No. 09/912,633, filed Jul. 25, 2001, Kline.
U.S. Appl. No. 09/915,459, filed Jul. 26, 2001, Kline.
U.S. Appl. No. 10/293,799, filed Nov. 13, 2002, Huebner.
U.S. Appl. No. 10/292,745, filed Nov. 12, 2002, Cope et al.
U.S. Appl. No. 10/292,714, filed Nov. 12, 2002, Cope.
U.S. Appl. No. 10/315,725, filed Dec. 10, 2002, Cope et al.
U.S. Appl. No. 10/319,317, filed Dec. 13, 2002, Mollenkopf et al.
U.S. Appl. No. 10/348,164, filed Jan. 21, 2003, Cope et al.
U.S. Appl. No. 10/385,899, filed Mar. 10, 2003, Mollenkopf.
Power Line Communications Conference entitled, "PLC, A New Competitor in Broadband Internet Access," Dec. 11-12, 2001, Washington, D.C., 60 pages.
"Embedded Power Line Carrier Modem," Archnet Electronic Technology, http://www.archnetco.com/english/product/ATL90.htm, © 2001, 3 pages.
"Archnet: Automatic Meter Reading System Power Line Carrier Communication", www.archnetco.com/english/product/product_sl.htm, © 2001, 3 pages.
"Power Line Communications Solutions", www.echelon.com/english/product/product_sl.htm, 3 pages, 2001.
Feduschak, N.A., "Waiting in the Wings: Is Powerline Technology Ready to Compete with Cable?", Mar. 2001, www.cabletoday.com/ic2/archives/0301/0301powerline.htm, 5 pages.
"Signalling on Low-Voltage Electrical Installations in the Frequency Band 3kHz to 148.5kHz-Part 4: Filters at the Interface of the Indoor and Outdoor Electricity Network", *CLC SC 105A (Secretariat)* May 1992, 62, 1-11.
"Intellon Corporation Test Summary for Transformerless Coupler Study", *Intellon No News Wires*, Dec. 24, 1998, DOT/NHTSA Order No. DTNH22-98-P-07632, pp. 1-18.
EMETCON *Automated Distribution System*, ABB Power T & D Company, Inc., Jan. 1990, Raleigh, North Carolina, No. B-919A, 14 pages.
"Dedicated Passive Backbone for Power Line Communications", *IBM Technical Disclosure Bulletin*, Jul. 1997, 40(7), 183-185.
"Centralized Commercial Building Applications with the Lonworks® PLT-21 Power Line Transceiver", *Lonworks Engineering Bulletin*, Echelon, Apr. 1997, pp. 1-22.
Plexeon Logistics, Inc., "Power Line Communications", www.plexeon.com/power.html, © 1998-2003, 2 pages.
"EMETCON Automated Distribution System: Communications Guide", *Westinghouse ABB Power T & D Company Technical Manual 42-6001A*, Sep. 1989, 55 pages.
Abraham, K.C. et al., "A Novel High-Speed PLC Communication Modem", *IEEE Transactions on Power Delivery*, Oct. 1992, vol. 7, No. 4, pp. 1760-1768.
J.M. Barstow., "A Carrier Telephone System for Rural Service", *AIEE Transactions*, 1947, 66, 301-307.
Chang, S.S.L., "Power-Line Carrier", *Fundamentals Handbook of Electrical and Computer Engineering*, vol. II-Communication, Control, Devices and Systems, John Wiley & Sons, New York, 1983, 617-627.

Chen, Y-F. et al. "Baseband Transceiver Design of a 128-Kbps Power-Line Modem for Household Applications", *IEEE Transactions on Power Delivery*, 2002, 17(2), 338-344.
Coakley, N.G. et al., "Real-Time Control of a Servosytem Using the Inverter-Fed Power Lines to Communicate Sensor Feedback", *IEEE Transactions on Industrial Electronics*, 1999, 46(2), 360-369.
Esmailian, T. et al., "A Discrete Multitone Power Line Communication System", *Department of Electrical and Computer Engineering*, University of Toronto, Ontario Canada, 2000 IEEE, pp. 2953-2956.
Kawamura, A. et al., "Autonomous Decentralized Manufacturing System Using High-speed Network with Inductive Transmission of Data and Power", *IEEE*, 1996, 940-945.
Kim, W-O., et al., "A Control Network Architecture Based on EIA-709.1 Protocol for Power Line Data Communications", *IEEE Transactions on Consumer Electronics*, 2002, 48(3), 650-655.
Lim, C.K. et al., "Development of a Test Bed for High-Speed Power Line Communications", School of Electrical and Electronic Engineering, Nanyang Technological University, Singapore, *IEEE*, 2000, 451-456.
Lokken, G. et al., "The Proposed Wisconsin electric Power Company Load Management System Using Power Line Carrier Over Distribution Lines", *1976 National Telecommunications Conference, IEEE*, 1976, 2.2-12.2-3.
Marthe, E. et al., "Indoor Radiated Emission Associated with Power Line Communication Systems", *Swiss Federal Institute of Technology Power Systems Laboratory IEEE*, 2001, 517-520.
Naredo, J.L. et al., "Design of Power Line Carrier Systems on Multitransposed Delta Transmission Lines", *IEEE Transactions on Power Delivery*, 1991, 6(3), 952-958.
Nichols, K., "Build a Pair of Line-Carrier Modems", *CRC Electronics-Radio Electronics*, 1988, 87-91.
Okazaki, H, et al., "A Transmitting, and Receiving Method for CDMA Communications Over Indoor Electrical Power Lines", *IEEE*, 1998, pp. VI-522-VI-528.
B. Don Russell, "Communication Alternatives for Distribution Metering and Load Management", *IEEE Transactions on Power Apparatus and Systems*, 1980, vol. PAS-99(4), pp. 1448-1455.
Sado, WN. et al., "Personal Communication on Residential Power Lines- Assessment of Channel Parameters", Nov. 6-10, 1995, *IEEE*, 532-537.
LONWORKS Engineering Bulletin, "Demand Side Management with LONWORKS® Power Line Transceivers," Dec. 1996, 36 pages.
HomePlug™ Powerline Alliance, HomePlug Initital Draft Medium Interface Specification, May 19, 2000, 109 pages.
HomePlug™ Powerline Alliance, HomePlug 0.5 Draft Medium Interface Specification, Nov. 28, 2000, 133 pages.
HomePlug™ Powerline Alliance, HomePlug Initital Draft Medium Interface Specification, Jul. 27, 2000, 109 pages.
HomePlug™ PowerLine Alliance, HomePlug 1.01 Specification, Dec. 1, 2001, 139 pages.
Summary of an IEEE Guide for Power-Line Carrier Applications, A Report by the Power System Communications Committee, *IEEE Transactions on Power Apparatus and Systems*, vol. PAS-99, No. 6, Nov./Dec. 1980, pp. 2334-2337.
De Wilde, W. R. et al., "Upwards to a Reliable Bi-Directional Communication Link on the LV Power Supplies for Utility Services: Field Tests in Belgium," Apr. 3-5, 1990, *Sixth International Conference on* , Manchester, UK, pp. 168-172.
Tanaka, M., "Transmission Characteristics of a Power Line Used for Data Communications at High Frequencies," IEEE Transactions on Consumer Electronics, Feb. 1989, vol. 35, No. 1, pp. 37-42.
Hasler, E. F. et al., "Communication Systems Using Bundle Conductor Overhead Power Lines," IEEE Transactions on Power Apparatus and Systems, Mar./Apr. 1975, vol. PAS-94, No. 2, pp. 344-349.
IEEE Guide for Power-Line Carrier Applications, ANSI/IEEE Std 643-1980, © 1980 by The Institute of Electrical and Electronics Engineers, Inc., pp. 1-80.
Hatori, M. et al., "Home Informatization and Standardization of Home Bus," IEEE Transactions on Consumer Electronics, Aug. 1986, vol. CE-32, No. 3, pp. 542-549.

Hunt, J. M. et al., "Electrical Energy Monitoring and Control System for the Home," IEEE Transactions on Consumer Electronics, Aug. 1986, vol. CE-32, No. 3, pp. 578-583.

Gutzwiller, F. W. et al., "Homenet: A Control Network for Consumer Applications," IEEE Transactions on Consumer Electronics, Aug. 1983, vol. CE-29, No. 3, pp. 297-304.

Burrascano, P. et al., "Digital Signal Transmission on Power Line Carrier Channels: An Introduction," IEEE Transactions on Power Delivery, Jan. 1987, vol. PWRD-2, No. 1, pp. 50-56.

Burr, A. G. et al., "Effect of HF Broadcast Interference on PowerLine Telecommunications Above 1 Mhz," © 1998 IEEE, pp. 2870-2875.

Onunga, J. et al., "Distribution Line Communications Using CSMA Access Control with Priority Acknowledgements," IEEE Transactions on Power Delivery, Apr. 1989, vol. 4, No. 2, pp. 878-886.

Tanaka, M., "High Frequency Noise Power Spectrum, Impedance and Transmission Loss of Power Line in Japan on Intrabuilding Power Line Communications," *IEEE Transactions on Consumer Electronics*, May 1988, vol. 34, No. 2, pp. 321-326.

Meng, H. et al., "A Transmission Line Model for High-Frequency Power Line Communication Channel," © 2002 IEEE, pp. 1290-1295.

Burrascano, P. et al., "Performance Evaluation of Digital Signal Transmission Channels on Coronating Power Lines," © 1988 IEEE, pp. 365-368.

DiClementi, D. A. et al., "Electrical Distribution System Power Line Characterization," © 1996 IEEE, pp. 271-276.

Jee G. et al., "Demonstration of the Technical Viability of PLC Systems on Medium- and Low-Voltage Lines in the United States;" IEEE Communication Magazine, May 2003, pp. 108-112.

Yoshitoshi, M. et al., "Proposed Interface Specifications for Home Bus," IEEE Transactions on Consumer Electronics, Aug. 1986, vol. CE-32, No. 3, pp. 550-557.

O'Neal, Jr., J. B., "The Residential Power Circuit as a Communication Medium," IEEE Transactions on Consumer Electronics, Aug. 1986, vol. CE-32, No. 3, pp. 567-577.

Dostert, K., "EMC Aspects of High Speed Powerline Communications," Proceedings of the 15th International Wroclaw Symposium and Exhibition on Electromagnetic Capability, Jun. 27-30, 2000; Wroclaw, Poland, pp. 98-102.

Piety, R. A., "Intrabuilding Data Transmission Using Power-Line Wiring," Hewlett-Packard Journal, May 1987, pp. 35-40.

Outlook Conference 2004: Amperion Deployment Overview, Primen Conference, May 7, 2004, 10 pages.

Dostert, K., Powerline Communications, Ch. 5, pp. 286-292, Prentice Hall PTR, Upper Saddle River, NJ © 2001.

Liu, E. et al., "Broadband Characterization of Indoor Powerline Channel," Communications Laboratory, Helsinki University of Technology, Finland [presented at the 2004 International Symposium on PowerLine Communications and its Applications, Zaragoza, Spain. Mar. 31-Apr. 2, 2004] 6 pages.

Rivkin, S.R., "Co-Evolution of Electric & Telecommunications Networks," *The Electricity Journal*, May 1998, 71-76.

Marketing Assessment Presentation entitled "Powerline Telecommunications," The Shpigler Group for CITI PLT, Jul. 16, 2002, 9 pages.

Campbell, C., presentation entitled "Building a Business Case for PLC: Lessons Learned From the Communication Industry Trenches," KPMG Conslting, Jul. 16, 2002, 5 pages.

"Texas Instruments: System Block Diagrams; Power Line Communication (Generic)", 2001. http://focus.ti.com/docs/apps/catalog/resources/blockdiagram.jhtml?bdId=638, 1 page.

"Coaxial Feeder Cables [Engineering Notes]", *PYE Telecommunications Limited Publication Ref No. TSP507/1*, Jun. 1975, Cambridge, England, 15 pages.

Kilbourne, B., "EEI Electric Perspectives: The Final Connection", www.eei.org/ep/editorial/Jul-01/0701conenct.htm, 7 pages.

International Search Report dated Jun. 24, 2002, from PCT/US02/04310.

Written Opinion dated Aug. 20, 2003, from PCT/US02/04310.

International Search Report dated Aug. 7, 2002, from PCT/US02/04300.

Dostert, K., Powerline Communications, Ch. 5, pp. 286, 288-292, Prentice Hall PTR, Upper Saddle River, NJ © 2001.

* cited by examiner

POWER LINE COMMUNICATION SYSTEM AND METHOD

CROSS REFERENCE TO RELATED APPLICATIONS

This application is a continuation of U.S. Pat. application No. 09/835,532 filed Apr. 16, 2001 (2171-013), now U.S. Pat. No. 6,958,680 which claims priority under 35 U.S.C. § 119(e) of U.S. Provisional Patent Application Ser. No. 60/197,615 filed Apr. 14, 2000, all of which are incorporated herein by reference in their entirety.

INTRODUCTION

The present invention relates generally to the field of digital communications. More particularly, the present invention relates to transmission of digital information via power lines.

BACKGROUND OF THE INVENTION

Referring to FIG. 1, a typical electric power distribution system having half loops 10 is illustrated. These half loops 10 are fed medium voltage (MV) power from the sub station. Medium voltage is in the tens of kilovolts range. A typical configuration has transformers 20 that step MV power down to low voltage (LV) power, low voltage being between 100 and 240 VAC. Each transformer 20 will typically feed LV power to several customers 30.

The half loop 10 uses cable that is either underground, which feeds pad-mounted transformers, or aerial cable, which feeds pole-mounted transformers. The transformers 20 step the MV down to LV. These transformers 20 are designed to work at very low frequencies (50-60 Hz typical) and do not allow high frequencies (greater than 100 KHz) to pass through. Each transformer 20 supplies several homes to the home electric utility meter 32, which is typically mounted on the outside of the home. Within the home, concentrated at the breaker panel 34, a web of electrical wires delivers the power to the outlets 36.

What is needed is a way to use this topology to deliver high-speed communications to residential homes in a cost effective way. Applications for such communication systems include high speed Internet, telephony, video conferencing and video delivery.

SUMMARY OF THE INVENTION

It is an object of the present invention to provide high-speed communications via an electrical distribution MV to LV topology.

It is another object of the present invention to provide high-speed Internet service via an electrical distribution MV to LV topology.

It is yet another object of the present invention to provide telephone and fax service via an electrical distribution MV to LV topology.

It is still another object of the present invention to provide video conferencing service via an electrical distribution MV to LV topology.

It is a further object of the present invention to provide video delivery via an electrical distribution MV to LV topology.

It is a further object of the present invention to provide residential and business security services via an electrical distribution MV to LV topology.

The present invention is a means of using the last portion of the electrical distribution system for high-speed communications to residential homes. An aggregation point interfaces a medium voltage power line with a point-of-presence, and a power line bridge enables flow of communications signals between the medium voltage power line and a low voltage power line across a distribution transformer.

BRIEF DESCRIPTION OF THE DRAWING

Additional objects and advantages of the present invention will be apparent in the following detailed description read in conjunction with the accompanying drawing figures.

DETAILED DESCRIPTION OF THE INVENTION

According to the present invention, the power delivery system is divided up into three communications channels when configured for high-speed communications:

1. the MV half loop,
2. the LV connection from the transformer to the home, and
3. the wiring within the home.

Figure 1:
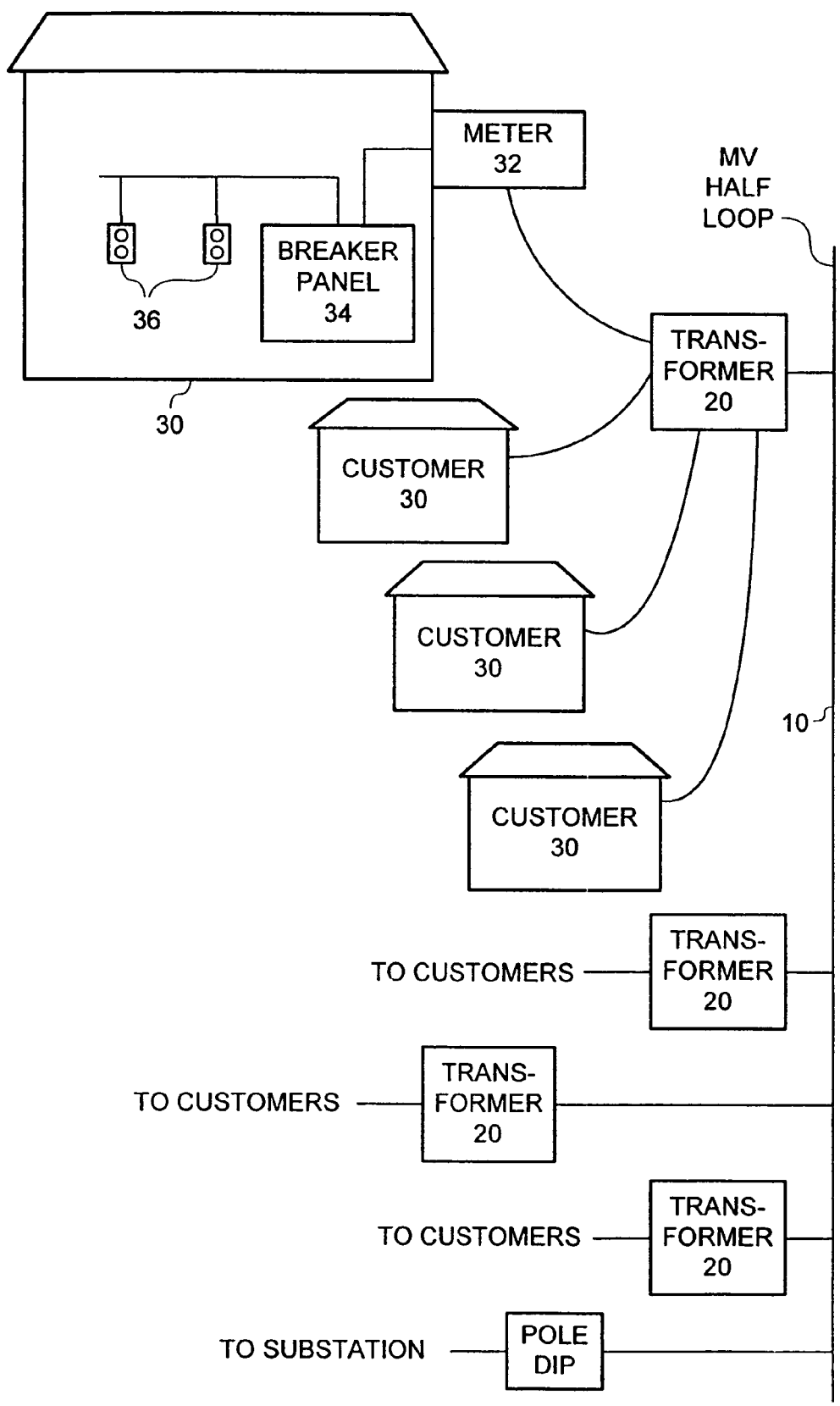
FIG. 1 illustrates topology of a typical electric power distribution system.
Figure 2:
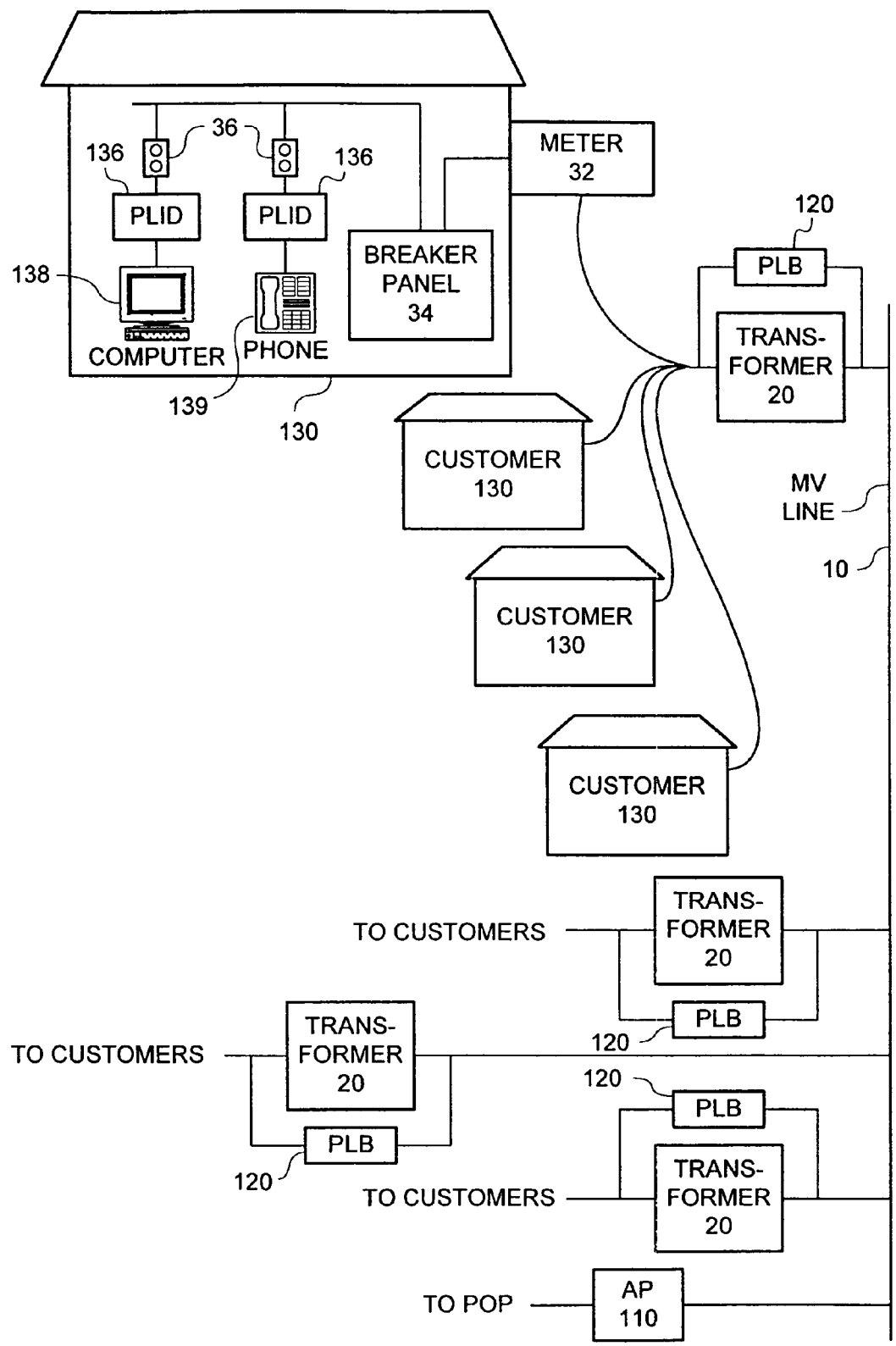
FIG. 2 illustrates topology of an electric distribution system modified to provide for communication, according to an embodiment of the present invention.

Referring to FIG. 2, a modification of the existing power distribution system for communications delivery is illustrated.

The first channel (the MV cable) 10 has the least amount of noise and least amount of reflections. This channel has the highest potential bandwidth for communications. This is important because it is the channel that concentrates all of the bandwidth from the other channels. The type of signal used on this channel can be almost any signal used in communications (CDMA, TDMA, FDM, OFDM to name a few). A wideband signal such as CDMA that is relatively flat in the spectral domain is preferred to minimize radiated interference to other systems while delivering high data rates. The first channel is fed by the AP (Aggregation Point) 110.

Figure 3:
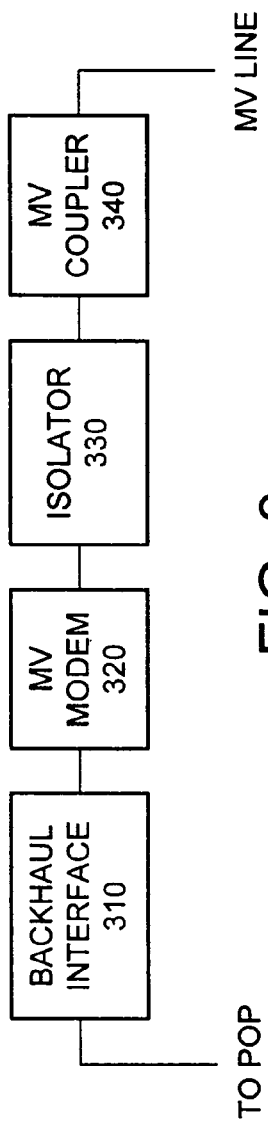
FIG. 3 illustrates a block diagram of an aggregation point according to an embodiment of the present invention.

Referring to FIG. 3, a block diagram of an AP according to an embodiment of the present invention is illustrated. The AP 300 communications to the outside world via the Point Of Presence (POP). The backhaul to the POP can utilize any type of technology, such as optical fiber, copper, or a wireless link. The Backhaul Interface 310 connects the outside world to the MV modem 320. The MV modem 320 modulates/demodulates the data so that it can be transmitted over the MV cable. The isolator 330 is used as an extra safety measure since the voltages present in the system are relatively high. A preferred isolator structure is based on opto-coupling. The MV coupler 340 is used to prevent the medium voltage power passing from the MV line to the rest of the AP's circuits 310, 320, 330, while allowing the communications signal to pass to/from the AP 300 from/to the MV line.

The second channel (the LV connection from the transformer to the home) and the third channel (the wiring within the home) have noise present from electrical appliances and reflections due to the "web" of wires. These channels can support a lower bandwidth than the MV (first) channel and they need a more intelligent (i.e., with more overhead) modulation schemes. There are several companies with chip sets to achieve good communications for LANs (local Area Network) such as: Adaptive Networks (Newton, Mass.), Inari (Draper, Utah), Intellion (Ocala, Fla.), DS2 (Valencia, Spain) and Itran (Beer-Sheva, Israel). These devices would work well for the LV channels.

Figure 4:
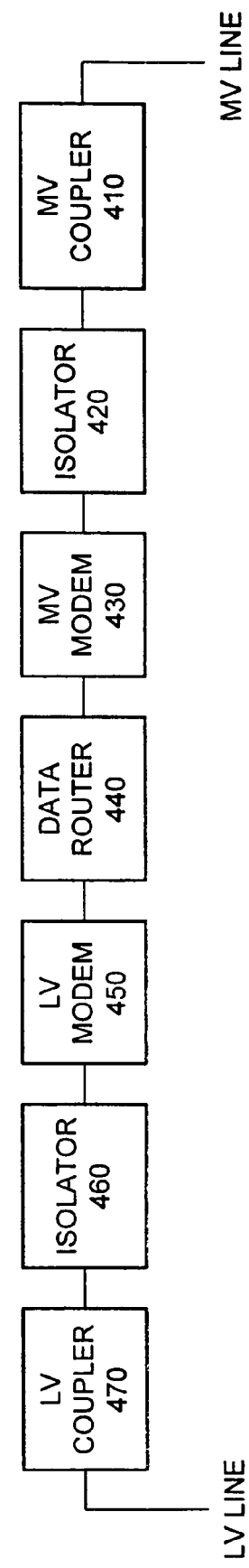
FIG. 4 illustrates a block diagram of a power line bridge according to an embodiment of the present invention.

Referring to FIG. 4, a block diagram of a Power Line Bridge (PLB) according to an embodiment of the present invention is illustrated. The PLB 400 shown, interfaces between the MV line on the primary of the transformer and the LV line on the secondary of the transformer. The MV coupler 410 is used to prevent the medium voltage power from passing to the rest of the PLB's circuits yet allowing the communications signal to pass to/from the PLB 400 from/to the MV line. The MV isolator 420 is used as an extra safety measure considering that the voltages present in the system are relatively high. A preferred Isolator 420 structure utilizes opto-coupling. The MV modem 430 modulates/demodulates the data so that it can be transmitted over the MV cable.

The data from/to the MV modem 430 is passed to the Data Router 440. The function of the Data Router 440 is to prioritize and gather packets from all of the LV side devices and pass them on to the MV side. The LV modem 450 modulates/demodulates the data so that it can be transmitted over the LV lines, this function utilizes powerline LAN chip set technology, as mentioned above. The LV isolator 460 and the LV coupler 470 serve the same function as the MV isolator 420 and the MV coupler 410, but on the LV side.

On the LV side of the transformer, the PLB 120 communicates with the Powerline Interface Devices (PLIDs) 136 at the customer location 130. A PLID 136 can have a variety of interfaces to the subscriber's equipment 138, 139. Some examples are RJ-11. Plain Old Telephone Service (POTS), RS-232, USB, and 10. Base-T. A subscriber can have multiple PLIDs 136 on the same internal wiring.

A system as disclosed herein is useful to provide data services to the residential market place at 10 Mbps. This makes an entire new range of applications practically available. Each device that is connected to the power would (if desired) have an address and would be accessible remotely. Some examples include remote utility meter reading, Internet Protocol (IP)-based stereo systems, IP-based video delivery systems, and IP telephony.

The present invention has been described in terms of preferred embodiments, however, it will be appreciated that various modifications and improvements may be made to the described embodiments without departing from the scope of the invention.

What is claimed is:

1. A system for providing communications over a power distribution system having a medium voltage power line, a plurality of low voltage power lines extending to customer residences, and a first transformer coupling the medium voltage power line to the low voltage power lines, the system comprising:
   an aggregation device having a first modem communicatively coupled to the medium voltage power line,
   said aggregation device further including a backhaul interface configured to provide communications via a backhaul link;
   a first transformer bypass device having a second modem communicatively coupled to the medium voltage power line for communications with said first modem;
   said first transformer bypass device further including a third modem configured to communicate with a plurality of communications devices at customer premises;
   said first transformer bypass device further including a router in communication with said second modem and said third modem; and
   wherein said first transformer bypass device provides a data path between the medium voltage power line and one or more communications devices at customer premises thereby bypassing the first transformer and wherein voltages of the medium voltage power line are not conducted to the plurality of low voltage power line by said first transformer bypass device.

2. The system of claim 1, wherein said aggregation device further comprises a coupling device forming at least part of a data path between said first modem and the medium voltage power line.

3. The system of claim 2, wherein said coupling device comprises an inductive coupling mechanism.

4. The system of claim 2, wherein said coupling device comprises magnetically permeable toroid disposed substantially around the circumference of the medium voltage power line and a winding coupled to said toroid.

5. The system of claim 1, wherein said backhaul interface is configured to communicate via a fiber optic cable.

6. The system of claim 1, wherein said backhaul interface is configured to provide wirelessly communications.

7. The system of claim 1, wherein said first modem and said second modem are configured to communicate using Orthogonal Frequency Division Multiplexing.

8. The system of claim 1, wherein the third modem is communicatively coupled to the one or more communications devices via the low voltage power lines.

9. The system of claim 8, wherein the one or more communications devices each includes a unique address.

10. The system of claim 8, wherein said third modem is configured to communicate using Orthogonal Frequency Division Multiplexing.

11. The system of claim 8, wherein said first transformer bypass device communicates video data.

12. The system of claim 1, wherein the third modem is communicatively coupled to the one or more communications devices via a wireless link.

13. The system of claim 12, wherein said transformer bypass device further comprises a power coupler configured to inductively draw power from the medium voltage power line.

14. The system of claim 13, wherein said transformer bypass device further comprises a power supply configured to receive power from said power coupler and to supply power to said second modem.

15. The system of claim 1, wherein said transformer bypass device further comprises a power coupler configured to inductively draw power from the medium voltage power line.

16. The system of claim 15, wherein said transformer bypass device further comprises a power supply configured to receive power from said power coupler and to supply power to said second modem.

17. The system of claim 1, wherein the third modem is communicatively coupled to the one or more communications devices via a fiber optic cable wireless link.

18. The system of claim 1, wherein said router is configured to prioritize transmission of data received from the one or more communications devices.

19. The system of claim 1, wherein said first transformer bypass device communicates telephony data.

20. The system of claim 1, wherein said first transformer bypass device communicates video data.

21. The system of claim 1, wherein the power distribution system comprises a second transformer coupled to the medium voltage power line, the system further comprising:
   a second transformer bypass device having a fourth modem communicatively coupled to the medium voltage power line for communications with said first modem;
   said second transformer bypass device further including a fifth modem configured to communicate with a plurality of communications devices at customer premises;
   said second transformer bypass device further including a second router in communication with said fourth modem and said fifth modem; and
   wherein said second transformer bypass device provides a data path between the medium voltage power line and one or more communications devices at customer premises thereby bypassing the second transformer.

22. A method of using a communication system to provide communications between a first and second communication device and a point of presence, the system comprising a bypass device in communication with an aggregation device via a medium voltage power line, the method comprising:
   at the bypass device:
      receiving a first data signal from the first communication device;
      demodulating the first data signal to provide first data;
      receiving a second data signal from the second communication device;
      demodulating the second data signal to provide second data;
      prioritizing the first and second data to determine transmission data;
      modulating a signal with the transmission data to form a transmission signal; and
      transmitting the transmission signal over the medium voltage power line; and
   at the aggregation device:
      receiving the transmission signal from the medium voltage power line;
      demodulating the transmission signal to provide transmitted data; and
      transmitting the transmitted data to the point of presence.

23. The method of claim 22, wherein the transmission data comprises telephony data.

24. The method of claim 22, wherein the transmission data comprises Internet data.

25. The method of claim 22, wherein the transmission data comprises video data.

26. The method of claim 22, wherein the transmission data comprises audio data.

27. The method of claim 22, wherein the modulating comprising Orthogonal Frequency Division Multiplexing.

28. The method of claim 22, where transmitting the transmitted data comprises wirelessly transmitting the transmitted data.

29. A method of using a communication system to provide communications between a communication device and a point of presence, the system comprising a bypass device in communication with an aggregation device in via a medium voltage power line, the method comprising:
   at the aggregation device:
      receiving first data transmitted from the point of presence; and
      transmitting the first data over the medium voltage power line in a first data signal;
   at the bypass device:
      receiving the first data signal;
      demodulating the first data signal to provide a first data packet;
      determining a destination of the first data packet;
      modulating a signal with the first data packet to form a transmission signal; and
      transmitting the transmission signal over a low voltage power line to the communication device.

30. The method of claim 29, wherein the first data comprises telephony data.

31. The method of claim 29, wherein the first data comprises Internet data.

32. The method of claim 29, wherein the first data comprises video data.

33. The method of claim 29, wherein the first data comprises audio data.

34. The method of claim 29, wherein the modulating comprising Orthogonal Frequency Division Multiplexing.

35. The method of claim 29, where transmitting the transmission signal comprises Orthogonal Frequency Division Multiplexing modulation of a signal with the first data packet.

* * * * *